(12) United States Patent
Somers

(10) Patent No.: US 6,204,335 B1
(45) Date of Patent: *Mar. 20, 2001

(54) COMPOSITIONS OF LINEAR ULTRA LOW DENSITY POLYETHYLENE AND PROPYLENE POLYMERS AND FILMS THEREFROM

(75) Inventor: Marc Stacey Somers, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/145,451

(22) Filed: Sep. 2, 1998

Related U.S. Application Data

(60) Provisional application No. 60/058,590, filed on Sep. 12, 1997.

(51) Int. Cl.$^7$ ..................................................... C08L 23/16
(52) U.S. Cl. ......................... 525/240; 526/348; 526/352; 526/351
(58) Field of Search .................................. 526/348, 352, 526/351; 525/240

(56) References Cited

U.S. PATENT DOCUMENTS

| | | |
|---|---|---|
| 3,700,753 * | 10/1972 | Terada et al. ................ 260/876 B |
| 4,123,417 | 10/1978 | Finberg et al. . |
| 4,275,119 | 6/1981 | Weiner . |
| 4,291,092 | 9/1981 | Weiner . |
| 4,339,496 | 7/1982 | Weiner . |
| 4,339,498 | 7/1982 | Weiner . |
| 4,340,640 | 7/1982 | Weiner . |
| 4,340,641 | 7/1982 | Weiner . |
| 4,348,455 | 9/1982 | Clayton . |
| 4,367,256 | 1/1983 | Biel . |
| 4,399,180 | 8/1983 | Briggs et al. . |
| 4,418,114 | 11/1983 | Briggs et al. . |
| 4,430,457 * | 2/1984 | Dobreski ........................ 523/100 |
| 4,536,549 | 8/1985 | Hattori et al. . |
| 4,542,188 | 9/1985 | van der Heijden . |
| 4,588,650 | 5/1986 | Mientus et al. . |
| 4,597,920 | 7/1986 | Golike . |
| 4,624,991 | 11/1986 | Haas . |
| 4,692,496 | 9/1987 | Bahl et al. . |
| 4,822,855 | 4/1989 | Kobayashi et al. . |
| 4,851,478 | 7/1989 | Su . |
| 4,861,834 | 8/1989 | Audureau et al. . |
| 4,871,813 | 10/1989 | Senez . |
| 4,929,681 | 5/1990 | Bahl et al. . |
| 4,985,498 | 1/1991 | Shirodkar . |
| 5,041,491 | 8/1991 | Turke et al. . |
| 5,047,468 | 9/1991 | Lee et al. . |
| 5,051,481 | 9/1991 | Taka et al. . |
| 5,085,927 | 2/1992 | Dohrer . |
| 5,087,667 | 2/1992 | Hwo . |
| 5,110,870 | 5/1992 | Fujii et al. . |
| 5,114,763 | 5/1992 | Brant et al. . |
| 5,126,398 | 6/1992 | Lee et al. . |
| 5,126,408 | 6/1992 | Rifi . |
| 5,147,936 | 9/1992 | Peszkin et al. . |
| 5,212,246 | 5/1993 | Ogale . |
| 5,218,046 | 6/1993 | Audureau et al. . |
| 5,254,617 | 10/1993 | Isoue et al. . |
| 5,262,228 | 11/1993 | Kobyama et al. . |
| 5,328,734 | 7/1994 | Morese-Seguela et al. . |
| 5,334,428 | 8/1994 | Dobreski et al. . |
| 5,344,714 | 9/1994 | Su . |
| 5,358,792 | 10/1994 | Mehta . |
| 5,374,677 | 12/1994 | Nishio et al. . |
| 5,378,764 | 1/1995 | Benham et al. . |
| 5,397,843 | 3/1995 | Lakshmanan et al. . |
| 5,407,732 | 4/1995 | Dokurno . |
| 5,455,303 * | 10/1995 | Panagopoulos, Jr. et al. ........ 525/95 |
| 5,464,905 | 11/1995 | Tsutsui et al. . |
| 5,478,890 | 12/1995 | Shinozaki et al. . |
| 5,489,478 | 2/1996 | Audry et al. . |
| 5,561,195 | 10/1996 | Govoni et al. . |
| 5,569,693 | 10/1996 | Doshi et al. . |
| 5,631,069 | 5/1997 | Wooster . |
| 5,635,262 | 6/1997 | Best . |
| 5,654,051 | 8/1997 | Andersson et al. . |
| 5,656,374 | 8/1997 | Marzola et al. . |

FOREIGN PATENT DOCUMENTS 0 109 512   5/1984   (EP) .

OTHER PUBLICATIONS

Research Disclosure, Jun. 1992, 33875, Amorphous Polyolefins as Tack Additives for Polyethylene Blown and Cast Film.

* cited by examiner

Primary Examiner—David W. Wu
Assistant Examiner—Ling-Siu Choi
(74) Attorney, Agent, or Firm—Jonathan D. Wood; Harry J. Gwinnell

(57) ABSTRACT

A novel composition is disclosed comprising about 80 to about 99 weight percent based on the composition, of a linear ultra low density polyethylene (LULDPE) and about 1 to about 20 weight percent of a propylene polymer comprising 0 to about 40 weight percent olefin comonomer units having 2 to 10 carbon atoms and from about 60 to about 100 weight percent propylene, based on the propylene polymer, the propylene polymer having a Brookfield Thermosel viscosity of about 1 to about 30,000 mPa·s at 190° C. and a needle penetration of about 5 to about 300 dmm at 23° C. Also disclosed are films produced from the composition, both blown and cast, and both monolayer and multilayer. Also disclosed are processes for stretch wrapping and forming blown and cast film.

23 Claims, No Drawings

COMPOSITIONS OF LINEAR ULTRA LOW DENSITY POLYETHYLENE AND PROPYLENE POLYMERS AND FILMS THEREFROM

CROSS REFERENCE TO RELATED APPLICATIONS

This application claims priority under 35 U.S.C. Section 119(e) to U.S. Provisional Application Ser. No. 60/058,590, filed Sep. 12, 1997. The present application is related to co-pending U.S. application Serial Nos. 09/104,726, 09/145,452, and 09/145,684.

FIELD OF THE INVENTION

The present invention relates to compositions having particular utility in the production of film. More particularly, the present invention relates to compositions comprising a blend of a linear ultra low density polyethylene (LULDPE) and a propylene polymer, having particular utility in the production of film, especially stretch wrap cling film.

BACKGROUND OF THE INVENTION

Blown film is preferable over cast film where high strength films are required. Linear low density polyethylene (LLDPE) and linear ultra low density polyethylene (LULDPE) are the most suitable for blown stretch film. However, for commercial applications, in the stretch wrapping industry, neither blown LLDPE nor blown LULDPE film has enough peel cling strength when stretched to 200 percent elongation, the commercially acceptable amount of stretching commonly required in stretch wrapping processes. Propylene polymer cling additives have been blended with LLDPE to provide monolayer blown stretch wrap film having commercially adequate cling at 200 percent elongation. The term "commercially adequate cling" is hereinafter defined as a peel cling strength of at least 100 g/2.54 cm, for convenience and clarity.

Multilayer blown stretch film is more versatile than monolayer film for many purposes. In an A/B/A or A/N/B/C type multilayer film, the core layer is typically about 80 weight percent of the film, with each of the two skin layers making up about 10 weight percent of the film.

Blown LLDPE and LULDPE have been found to be inadequate skin layers in multilayer stretch wrap film. They do not provide enough peel cling strength when the multilayer film is stretched to 200 percent elongation. Propylene polymer cling additives have been blended with LLDPE for use in multilayer blown stretch film. However, LLDPE skin layers require a relatively high concentration of propylene polymer cling additive to be effective.

In light of the above, it would be desirable to provide a new blown film composition suitable for use in making both monolayer blown stretch cling film and multilayer blown stretch cling film. It would be further desirable if a stretched multilayer film comprising a skin layer formed from such new composition would provide adequate cling.

SUMMARY OF THE INVENTION

The present invention relates to a composition of matter which comprises a blend of about 80 to about 99 weight percent based on the composition of a linear ultra low density polyethylene having a density of less than about 0.916 g/cm$^3$, and about 1 to about 20 weight percent based on the composition of a propylene polymer comprising 0 to about 40 weight percent based on the copolymer of olefin comonomer units having 2 to 10 carbon atoms and from about 60 to about 100 weight percent propylene, based on the copolymer, said propylene polymer having a Brookfield Thermosel viscosity of about 1 to about 30,000 mPa·s at 190° C. and a needle penetration hardness of about 5 to about 300 dmm at 23° C.

DETAILED DESCRIPTION OF THE INVENTION

The applicant was surprised to find that particular propylene polymers can be usefully blended with LULDPE to form a composition useful in making both monolayer and multilayer blown stretch cling film and cast film. Film formed from the LULDPE composition of the present invention provides unexpectedly effective cling when used as a skin layer of a multilayer stretch cling film.

The composition of the present invention comprises about 80 to about 99 weight percent LULDPE component based on the composition, and about 1 to about 20 weight percent propylene polymer based upon the total weight of the composition. More particularly, the present composition comprises LULDPE having a density of less than about 0.916 g/cm$^3$, and about 1 to about 20 weight percent propylene polymer containing 0 to about 40 weight percent olefin comonomer units having 2 to 10 carbon atoms. The propylene polymer has a Brookfield Thermosel viscosity of about 1 to about 30,000 mPa·s at 190° C., and a needle penetration of about 5 to about 300 dmm at 23° C.

LULDPE has excellent direction (MD) elongation, good tear resistance, good tensile strength, and good puncture resistance. LULDPE is a copolymer of ethylene and an alpha olefin comonomer, with density of less than about 0.916 g/cm$^3$, preferably from about 0.88 to about 0.916 g/cm$^3$, more preferably about 0.9 to about 0.914 g/cm$^3$. LULDPE has a melt index (MI) of about 0.4 to about 8 g/10 min., preferably about 0.5 to about 4 g/10 min. The LULDPE used is more preferably an ethylene-octene or ethylene-hexene LULDPE copolymer. A minor amount of other film-forming polyolefins such as LDPE, LLDPE, polypropylene, and ethylene vinyl acetate copolymer (EVA) may also be present in the film-forming component. The present composition comprises preferably about 85 to about 99 weight percent LULDPE, and from about 1 to about 15 weight percent propylene polymer, based on the composition.

The alpha olefin comonomer of the ethylene alpha olefin copolymer preferably has from 3 to 20 carbon atoms per molecule and is present in an amount of from about 2 to about 20 weight percent based on the ethylene alpha olefin copolymer. Examples of the alpha olefin comonomer include 1-butene, 1-pentene, 4-methyl-1-pentene, 1-hexene, 1-octene, 1-nonene, 1-decene, 1-dodecene, a terpolymer of ethylene, a terpolymer of 1-butene, a terpolymer of 1-hexene, and mixtures and derivatives thereof. In a preferred embodiment, the alpha olefin is selected from 1-butene, 1-hexene and 1-octene.

The LULDPE component of the composition may be prepared readily by any conventional technique known in the art.

The present propylene polymer comprises 0 to about 40 weight percent C2 to C10 olefin comonomer unit content and from about 60 to about 100 weight percent propylene, based upon the total propylene polymer. The propylene polymer preferably comprises 0 to about 25 weight percent comonomer unit content, and from about 75 to about 100 weight percent propylene, based upon the polymer, more preferably 0 to about 20 weight percent comonomer unit content and from about 80 to about 100 weight percent propylene. The olefin comonomer units are preferably ethylene units.

A particularly surprising aspect of the present invention is the broad range of molecular weights and hardness levels possible for a suitable propylene polymer. The molecular weight is evidenced by the viscosity at 190° C., determined by the Brookfield Thermosel viscosity method. The viscosity range of the propylene polymer of the present invention is from about 1 to about 30,000 mPa·s, at 190° C. The viscosity is preferably from about 1 to about 15,000 mPa·s, at 190° C., more preferably from about 1 to about 7,000 mPa·s, at 190° C. with about 1 to about 5,000 mPa·s, at 190° C. being most preferred. A composition comprising a propylene polymer having a viscosity of from about 1 to about 2,000 mPa·s at 190° C. is most suitable for use in producing blown film.

The propylene polymer of the present invention can contain a measurable amount of crystallinity, more than 1 weight percent by a hexane extraction method such as ASTM D5227, or can be totally amorphous. The propylene polymer has a needle penetration range of about 5 to about 300 dmm, determined by ASTM (test method modified to 23°, instead of 25° C.). The propylene polymer preferably has a needle penetration of about 5 to about 200 dmm at 23° C., with about 5 to about 100 dmm at 23° C. being more preferable.

The propylene polymer component of the composition utilized herein may be produced by a process disclosed in Canadian Patent 1,296,484, entitled "Process for the Direct Synthesis of Highly Amorphous Propylene Homopolymers and Propylene-Ethylene Copolymers." Some of the propylene copolymer components within the scope of the present invention may also be purchased from Eastman Chemical Company, Kingsport, Tenn. under the Eastman Chemical Company Trademark, EASTOFLEX.

The exact amounts of the LULDPE component and the propylene polymer component of the compositions herein are determined by the application for which film produced therefrom is to be employed. Variation of the amounts of each component is within the scope of one skilled in the art.

For many purposes, it may be desirable to incorporate other conventional additives with the compositions of the present invention. For example, there may be added antioxidants, heat and light stablilizers, dyes, antistatic agents, preservatives, processing aids, pigments, flame retardants, and the like.

The compositions of the LULDPE component defined hereinabove and the propylene polymer defined hereinabove are readily prepared by any method known in the art. For example, the components of the composition may be blended together by melt extrusion or may be admixed together on a conventional mixing machine such as an extruder or a continuous mixer.

The composition of the present invention has good peel cling strength for use in forming stretch wrap film. For purposes of the present application, commercially adequate peel cling strength has been determined to be at least 100 g/2.54 cm, measured at 200 percent elongation. It is now commonplace for stretch wrap film to be elongated to 200 percent and higher, during a stretch wrapping process. Peel strength generally decreases with more elongation. Therefore, it is important to determine that the peel cling strength of a film be adequate at 200 percent elongation, instead of being measured only when unstretched, as has been past practice. At 200 percent elongation, a film (both monolayer and multilayer films) formed from the composition of the present invention preferably has a peel cling strength of about 100 to about 500 g/2.54 cm, preferably abut 100 to about 400 g/2.54 cm, with about 100 to about 300 g/2.54 cm being more preferable, determined using ASTM Method D5458-95 "Standard Test Method for Peel Cling of Stretch Wrap Film."

The composition of the present invention can be formed into stretch wrap film using any technique known in the art, such as a cast method or blown film method. The present invention includes a blown film process wherein an extruder having an annular die is used for extruding the composition of the present invention. Air is blown in through the extruder die to form a bubble of the present polymer blend having a blow-up ratio of 1 to 3.5 times the die diameter. After a cooling air stream cures the film, the film is wound onto rolls. More particularly, a composition, as defined hereinabove is introduced into the feed hopper of an extruder that is water-cooled and resistance heated. The films were produced using an annular die having a die gap, of about 2.24 mm having a dual orifice nonrotating, nonadjustable air ring. The film is extruded through the die into a film that is cooled by blowing air onto the surface of the film in a blowing manner. The film is drawn from the die typically forming a cylindrical film that is cooled, collapsed, optionally slit, and wound to form a roll of film.

In preparing cast film, any of the well known cast film forming procedures may be utilized. For example, a composition, as defined hereinabove, is introduced into the feed hopper of an extruder that is water cooled and resistance heated. The films were produced using a slot-type die where a sheet of the polymer is extruded onto chilled rolls. After cooling by the chilled rolls, the resulting film is wound onto film cores. Optionally, the film may be slit prior to winding the film onto the film cores.

The present invention further includes a film of the composition of the present invention. The preferable film is a blown stretch wrap cling film. The film generally has higher puncture strength and a higher gloss than the neat LULDPE. The film made from the composition of the present invention generally also has a high speed unwinding noise not greater than the unwinding noise of neat LULDPE. This is important in light of the OSHA noise workplace restrictions. The present invention also includes articles of manufacture comprising a film of the composition of the present invention. Such articles include monolayer films and multilayer films in which the film of the composition of the present invention is at least one layer.

The present invention further includes a process for stretch wrapping, using a film of the composition of the present invention. The process comprises wrapping the film of the present invention about the girth of a unitized plurality of goods so that the film is in a stretched condition and the end region of the film is attached to a previous area of film by cling force.

The invention will be more readily understood by reference to the following examples. There are, of course, many other forms of the invention which will become obvious to one skilled in the art, once the invention has been fully disclosed, and it will accordingly be recognized that these examples are given for the purpose of illustration only, and are not to be construed as limiting the scope of this invention in any way.

EXAMPLES

The following test procedures were used in evaluating the analytical properties of the compositions herein and in evaluating the physical properties of the films of the examples.

Cling values were obtained in accordance with ASTM D5458-95 entitled "Standard Test Method for Peel Cling of Stretch Wrap Film."

Noise level, in decibels, dB, was measured by unwinding the film rolls at speeds of about 20 m/min. to about 70 m/minute. A digital sound meter was used to measure the level of sound generated by the film roll while unwinding.

Haze—ASTM D1003
Dart—ASTM D1709A
Gloss—ASTM D2457
Tear—ASTM D1922
Puncture—ASTM D4649
Viscosity—ASTM D3236 (at 190° C.)
Needle Penetration—ASTM (at 23° C.)
Melt index—ASTM D1238 (at 190° C.)
Density—ASTM D4888

Several commercially available propylene polymers from Eastman Chemical Company were used to conduct the experiments shown below. These propylene polymers are in the line of polymers known as the EASTOFLEX polymers. Each commercial polymer is referred to below simply by the trademark for that product. The properties of each of these polymers are listed in the appropriate tables below.

Example 1

The present example illustrates the unexpectedly high amount of peel cling strength of a film of the present invention. In this example, the film of the present invention was compared against an LLDPE film containing comparable amounts of propylene polymer as skin layers of A/B/A type multilayer film.

The following propylene polymers were evaluated as multilayer blown film additives in a series of linear low density polyethylene (LLDPE) ethylene-hexene copolymers. The hexene-LLDPEs ranged in density from about 0.906 g/cm$^3$ to about 0.920 g/cm$^3$ and in melt index from about 0.5 g/10 min. to about 2.0 g/10 min. Materials having a density below about 0.916 g/cm$^3$ are considered linear ultra low density polyethylenes (LULDPEs). The 0.001 inch (0.025 mm) thick films were made with a blow-up ratio of about 2.4:1 at about 60 feet/minute (18.3 ml/minute). The film structures were A/B/A with core layer (B Layer) comprising 80% by weight of the entire structure. The core layer in all film samples was a 0.9 g/10 min. melt index, 0.920 g/cm$^3$ density ethylene-hexene copolymer. The outside (skin) layers (A Layers) were each 10% by weight of the film structure and were also made from ethylene-hexene copolymers. The following propylene polymers shown in Table 1 were evaluated in these polymers at levels of about 4% and about 8% by weight in the outside film layers. The properties of EASTOFLEX E1003 polymer are typical properties.

TABLE 1

| Propylene Polymer | Properties | | |
|---|---|---|---|
| | Visc., mPa · s at 190° C. | Wt. % Ethylene | Needle Pen. dmm |
| EASTOFLEX E1003 | 250 | 18.0 | 100 |
| X24113-125-10 | 212 | — | approximately 24 |

Tables 2–6 contain the peel cling data for the above described films measured 2 weeks after the film were produced. Separate tables were made for each type of skin layer polymer. EASTOFLEX E1003 propylene polymer was evaluated in only one skin layer polymer (about 0.9 g/10 min. melt index and about 0.910 g/cm$^3$ density LLDPE).

TABLE 2

(Hexene LLDPE - Comparative)
Skin Layer = About 0.9 g/10 min. Melt Index and About 0.920 g/cm$^3$ Density

| Propylene Polymer | Unelongated Peel Cling, g/2.54 cm | Elongated Peel Cling, g/2.54 cm |
|---|---|---|
| None | 0 | 0 |
| 4% X24113-125-10 | 202 | 0 |
| 8% X24113-125-10 | 243 | 0 |

TABLE 3

(Hexene LLDPE - Comparative)
Skin Layer = About 0.9 g/10 min. Melt Index and About 0.918 g/cm$^3$ Density

| Propylene Polymer | Unelongated Peel Cling, g/2.54 cm | Elongated Peel Cling, g/2.54 cm |
|---|---|---|
| None | 173 | 0 |
| 4% X24113-125-10 | 373 | 0 |
| 8% X24113-125-10 | 500 | 67 |

TABLE 4

(Hexene LULDPE)
Skin Layer = About 0.9 g/10 min. Melt Index and About 0.910 g/cm$^3$ Density

| Propylene Polymer | Unelongated Peel Cling g/2.54 cm | Elongated Peel Cling g/2.54 cm |
|---|---|---|
| None | 172 | 0 |
| 4% E1003 | 481 | 83 |
| 8% E1003 | 695 | 130 |
| 4% X24113-125-10 | 565 | 65 |
| 8% X24113-125-10 | 745 | 153 |

TABLE 5

(Hexene LULDPE)
Skin Layer = About 2.0 g/10 min. Melt Index and About 0.910 g/cm$^3$ Density

| Propylene Polymer | Unelongated Peel Cling, g/2.54 cm | Elongated Peel Cling, g/2.54 cm |
|---|---|---|
| None | 187 | 0 |
| 4% X24113-125-10 | 688 | 0 |
| 8% X24113-125-10 | 774 | 107 |

TABLE 6

(Hexene LULDPE)
Skin Layer = About 0.5 g/10 min. Melt Index and About 0.906 g/cm$^3$ Density

| Propylene Polymer | Unelongated Peel Cling, g/2.54 cm | Elongated Peel Cling, g/2.54 cm |
|---|---|---|
| None | 0 | 0 |
| 4% X24113-125-10 | 144 | 0 |
| 8% X24113-125-10 | 445 | 187 |

From the data in Tables 2–6 above, the following general observations may be made. Tables 4–6 describe films produced from LULDPE and propylene polymer, having greater levels of peel cling, both unelongated and elongated, at equivalent levels of propylene polymer, than films shown in Tables 2 and 3 produced from LLDPE and propylene polymers of the same type and at the same loading. Further, as shown in Table 4, films of the present invention produced from LULDPE and propylene polymer of the present invention, both at levels of 4 and 8 percent, exhibit higher levels of peel cling, both unelongated and elongated, than films produced from neat LULDPE. Finally, it is observed from the data in Tables 4–6, that as the amount of propylene polymer in the LULDPE film is increased, the level of peel cling achieved is also increased.

Example 2

The present example illustrates other property improvements imparted to a multilayer blown film of the present invention. Data shown in Example 1 indicate the utility of a propylene polymer herein to obtain peel cling in a multilayer LULDPE blown film. This example will show that film properties other than peel cling can be improved by adding the same propylene polymer as in Example 1 to the skin layer of a LLDPE film structure with LULDPE skins.

X24113-125-10 propylene polymer was evaluated in a multi-layer blown film having a core layer of an LLDPE ethylene-hexene copolymer. The hexene-LULDPE skin layer had a density of about 0.906 g/cm$^3$ and a melt index of about 0.5 g/10 min. The 0.001 inch (0.025 mm) thick films were made with a blow-up ratio of about 2.4:1 at about 60 feet/minute (18.3 m/minute). The film structures were A/B/A with the core layer (B Layer) comprising 80% by weight of the entire structure. The core layer in all film samples was a 0.9 g/10 min. melt index, 0.920 g/cm$^3$ density ethylene-hexene copolymer. The outside (skin) layers (A Layers) were each 10% by weight of the film structure and were also made from ethylene-hexene copolymers.

X24113-125-10 had the properties shown in Table 7 below. In Table 8 are reported the data showing the improved film properties, resulting from incorporating the propylene polymer in the LULDPE skin layer.

TABLE 7

Properties

| Propylene Polymer | Visc., mPa · s at 190° C. | Wt. % Ethylene | Needle Pen. dmm |
|---|---|---|---|
| X24113-125-10 | 212 | — | Approximately 24 |

TABLE 8

Hexene-LLDPE Film Properties Containing 8% Propylene Polymer in LULDPE Skin Layers

| Propylene Polymer | None | 8% X24113-25-10 |
|---|---|---|
| Haze, % | 15.9 | 7.1 |
| Gloss, % | 58.8 | 65.0 |
| Dart Impact, g | 211 | 244 |
| MD Elongation, % | 755 | 785 |
| Puncture Penetration, cm | 11.4 | 13.0 |

Example 3

This example, using a monolayer film will show the added benefits of using a low viscosity propylene polymer in linear ultra low density polyethylene (LULDPE). This example will show that several film properties in addition to peel cling were improved by adding the propylene polymer to the LULDPE. The LULDPE materials in this example range in density from about 0.906 g/cm$^3$ to about 0.910 g/cm$^3$ and in melt index from about 0.5 g/10 min. to about 2.0 g/10 min. Products with densities of less than 0.916 g/cm$^3$ are commonly considered LULDPE products.

EASTOFLEX E1003, X24113-125-11 and X24113-125-15 propylene polymers were evaluated in monolayer blown film produced from LULDPE ethylene-hexene copolymer. The 0.0009 inch (0.023 mm) thick films were made with a blow-up ratio of about 2.4:1 at about 88 feet/minute (26.8 m/minute). The propylene polymer properties are shown in Table 9. The properties of E1003 are typical properties. The film properties are shown in Tables 10 and 11.

TABLE 9

Properties

| Propylene Polymer | Visc. mPa · s at 190° C. | Wt. % Ethylene | Needle Pen. dmm |
|---|---|---|---|
| X24113-125-11 | 187 | — | approximately 24 |
| X24113-125-15 | 180 | — | approximately 24 |
| E1003 | 250 | 18.0 | 100 |

TABLE 10

0.9 MI, 0.910 Density LULDPE Film Properties

| Film Property | No Propylene Polymer | 2% E1003 | 2% X24113-125-15 |
|---|---|---|---|
| Unelongated Peel Cling, g/2.54 cm | 216 | 278 | 315 |
| Elongated Peel cling, g/2.54 cm | 0 | 102 | 225 |
| Haze, % | 5.2 | 4.4 | 3.6 |
| Gloss, % | 67.4 | 73.4 | 75.9 |
| Dart Impact, g | 882 | >2,000 | 1760 |
| MD Elongation, % | 660 | 655 | 705 |
| Puncture Penetration, cm | 11.6 | 12.7 | 12.2 |

TABLE 11

2.0 MI, 0.910 Density LULDPE Film Properties

| Film Property | No Propylene Polymer | 2% X24113-125-11 |
|---|---|---|
| Unelongated Peel Cling, g/2.54 cm | 161 | 328 |
| Elongated Peel Cling, g/2.54 cm | 0 | 147 |
| Haze, % | 8.3 | 6.1 |
| Gloss, % | 65.9 | 68.2 |
| Dart Impact, g | 386 | 426 |
| MD Elongation, % | 590 | 720 |
| Puncture penetration, cm | 11.7 | 13.3 |

The data in Tables 10 and 11 reveal that incorporating propylene polymers into the LULDPE films of the present invention result in improved peel cling, optical properties, Dart impact and puncture resistance.

Example 4

This example shows that a given level of peel cling is obtained for a film produced from LULDPE and a propylene polymer at a lower level of propylene polymer than is required for a film produced from a higher density LLDPE product. As a comparison, the data of Example 3 should be considered. This example will show the properties of LLDPEs with densities from about 0.918 g/cm$^3$ to about 0.920 g/cm$^3$, and having a melt index of about 0.9 g/10 min. Products with densities of about 0.916 g/cm$^3$ to about 0.940 g/cm$^3$ are commonly considered LLDPE products.

X24113-125-10 and X24113-125-15 propylene polymers were evaluated in monolayer blown film produced from LLDPE ethylene-hexene copolymer. The 0.0009 inch (0.023 mm) thick films were made with a blow-up ratio of about 2.4:1 at about 88 feet/minute (26.8 m/minute). The properties of X24113-125-10 and X24113-125-15 propylene polymers are shown in Table 12. The film properties are shown in Tables 13 and 14.

TABLE 12

| Propylene Polymer | Properties | | |
|---|---|---|---|
| | Visc. mPa · s at 190° C. | Wt. % Ethylene | Needle Pen. dmm |
| X24113-125-10 | 212 | — | approximately 24 |
| X24113-125-15 | 180 | — | approximately 24 |

TABLE 13

0.9 MI, 0.918 Density LLDPE Film Properties

| Film Property | No Propylene Polymer | 2% X24113-125-10 | 4% X24113-125-10 |
|---|---|---|---|
| Unelongated Peel Cling, g/2.54 cm | 0 | 272 | 544 |
| Elongated Peel Cling, g/2.54 cm | 0 | 59 | 211 |
| Haze, % | 7.2 | 5.4 | 5.0 |
| Gloss, % | 67.2 | 72.5 | 71.4 |
| MD Elongation, % | 645 | 825 | 670 |
| Puncture Penetration, cm | 9.9 | 12.1 | 12.1 |

TABLE 14

0.9 MI, 0.920 Density LLDPE Film Properties

| Film Property | No Propylene Polymer | 2% X24113-125-15 | 4% X24113-125-15 |
|---|---|---|---|
| Unelongated Peel Cling, g/2.54 cm, | 0 | 211 | 291 |
| Elongated Peel Cling, g/2.54 cm | 0 | 43 | 141 |
| Haze, % | 6.7 | 5.8 | 5.4 |
| Gloss, % | 68.5 | 71.2 | 70.5 |
| Puncture Penetration, cm | 10.3 | 10.8 | 11.6 |

The data in Tables 13 and 14 reveal that LLDPE films containing propylene polymer require about twice as much of the propylene polymer, by weight, to exhibit reasonably similar peel cling levels to those of an LULDPE film. This is evident by comparing the results of the present Example 4 with the results of Example 3.

Example 5

The present example illustrates that the composition of the present invention provides film having decreased noise levels when unwinding the film at high speed.

Normal turntable type stretch wrap machines unwind film rolls at relatively low speeds. The unwind speed of a roll of stretch film on a LANTECH LAN-WRAPPER was measured at about 42 rpm (about 20 m/min). It is estimated that high speed "arm" stretch wrap machines operate at about twice this speed (about 40 m/min). The properties of the propylene polymer used in this example are shown in Table 15. The X24113-125-15 propylene polymer was added to two LULDPE products ranging in density from about 0.906 g/cm$^3$ to about 0.910 g/cm$^3$ and in melt index from about 0.5 g/10 min. to about 0.9 g/10 min. This will be compared to skin layers comprising neat LULDPE (containing no propylene polymer). All films in this example contain a hexene-LLDPE core layer having a density of about 0.920 g/cm$^3$ and a melt index of about 0.9 g/10 min. The 0.001 inch (0.025 mm) thick films were made with a blow-up ratio of about 2.4:1 at about 60 feet/minute (18.3 m/minute). The film structures were A/B/A with the core layer (B Layer) comprising 80% by weight of the entire structure. The skin layers (A Layers) each comprise about 10% by weight of the film structure (about 20% by weight total).

TABLE 15

| Propylene Polymer | Properties | | |
|---|---|---|---|
| | Visc., mPa · s at 190° C. | Wt. % Ethylene | Needle Pen. dmm |
| X24113-125-15 | 180 | — | approximately 24 |

The unwinding noise and peel cling values of films containing about 8% by weight of X24113-125-15 propylene polymer in the skin layers of a three-layer blown film were compared to skin layers of a LULDPE containing no propylene polymer and are shown in Tables 16 and 17. Noise data were measured by a decibel meter and maximum noise levels were recorded. The film roll unwinding speed was measured at about 60 rpm (about 41 m/min). The equipment used to unwind the film was measured as having a maximum noise of 71 decibels (dB) when running without film on the rollers. The peel cling values were measured 2 weeks after the films were produced.

The data below shows the benefit of using LULDPE containing propylene polymer in the skin layer of stretch film versus using neat LULDPE. The film had the highly unexpected combination of higher peel cling in combination with lower unwinding noise at high unwinding speeds.

TABLE 16

0.5 MI, 0.906 Density LULDPE Skin Layer Films

| Film Property | LULDPE Skins No Propylene Polymer | 8% Propylene Polymer in LULDPE Skins |
|---|---|---|
| Unelongated Peel Cling, g/2.54 cm | 0 | 445 |
| Elongated Peel Cling, g/2.54 cm | 0 | 187 |
| Max. Unwinding Noise, dB | 84 | 79 |

TABLE 17

0.9 MI, 0.910 Density LULDPE Skin Layer Films

| Film Property | LULDPE Skins No Propylene Polymer | 8% Propylene Polymer in LULDPE Skins |
|---|---|---|
| Unelongated Peel Cling, g/2.54 cm | 172 | 745 |
| Elongated Peel Cling, g/2.54 cm | 0 | 153 |
| Max. Unwinding Noise, dB | 78 | 77 |

In all of the examples herein where films were produced from LULDPE, those containing added propylene polymer consistently showed increased peel cling, improved optical properties (reduced haze and increased gloss), and increased puncture resistance, as compared to films produced from neat LULDPE (no propylene polymer). Moreover, as shown in Tables 16 and 17, the presence of propylene polymer in the LULDPE films unexpectedly did not increase the unwinding noise level, as compared to neat LULDPE. This is completely unexpected since it is generally known that films containing peel cling additives are generally characterized by having increased noise levels.

It should be clearly understood that the forms of the invention herein described are illustrative only and are not intended to limit the scope of the invention. The present invention includes all modifications falling within the scope of the following claims.

I claim:

1. A composition comprising:
   (a) from about 80 to about 99 weight percent based on the total weight of the composition of a linear ultra low density polyethylene having a density of less than about 0.916 g/cm$^3$; and
   (b) from about 1 to about 20 weight percent based on the total weight of the composition of a propylene polymer comprising 0 to about 40 weight percent olefin comonomer units having 2 to 10 carbon atoms, based on the total weight of the propylene polymer and from about 60 to about 100 weight percent propylene, based on the propylene polymer, wherein the propylene polymer has a Brookfield Thermosel viscosity of from about 1 to about 30,000 mPa·s at 190° C. and a needle penetration of from about 5 to about 300 dmm, determined according to ASTM, at 23° C.

2. The composition according to claim 1 wherein the polyethylene is an ethylene alpha olefin copolymer wherein the olefin comonomer has from 3 to 20 carbon atoms and is present in an amount of from about 2 to about 20 weight percent based on the ethylene alpha olefin copolymer.

3. The composition according to claim 2 wherein the alpha olefin comonomer is selected from 1-butene, 1-hexene and 1-octene.

4. The composition according to claim 1 wherein the propylene polymer comprises 0 to about 25 weight percent olefin comonomer units, and from about 75 to about 100 weight percent propylene.

5. The composition according to claim 4 wherein the propylene polymer comprises 0 to about 20 weight percent olefin comonomer units, and from about 80 to about 100 weight percent propylene.

6. The composition according to claim 1 wherein the polyethylene has a density of from about 0.88 to about 0.916 g/cm$^3$.

7. The composition according to claim 1 wherein the olefin comonomer units of the propylene polymer are ethylene units.

8. The composition of claim 1 wherein the propylene polymer is polypropylene homopolymer.

9. The composition according to claim 1 wherein the propylene polymer
   has a Brookfield Thermosel viscosity of from about 1 to about 15,000 mPa·s at 190° C.

10. The composition according to claim 9 wherein the propylene polymer has a Brookfield Thermosel viscosity of from about 1 to about 7,000 mPa·s at 190° C.

11. The composition according to claim 10 wherein the propylene polymer has a Brookfield Thermosel viscosity of from about 1 to about 5,000 mPa·s at 190° C.

12. The composition according to claim 1 wherein the propylene polymer
    has a needle penetration of from about 5 to about 200 dmm at 23° C.

13. The composition according to claim 12 wherein the propylene polymer has a needle penetration of from about 5 to about 100 dmm at 23° C.

14. The composition according to claim 1 wherein the linear ultra low density polyethylene is present in an amount of from about 85 to about 99 weight percent and the propylene polymer is present in
    an amount of from about 1 to about 15 weight percent.

15. A film formed from the composition according to claim 1.

16. The film according to claim 15 further having a peel cling strength of at least 100 g/2.54 cm, determined according to ASTM D5458-95.

17. The film according to claim 15 wherein the film is a blown film.

18. The film according to claim 15 wherein the film is a cast film.

19. The film according to claim 15 wherein the film is a stretch wrap film.

20. The film according to claim 15 wherein the film is a blown stretch wrap film.

21. The film according to claim 15 wherein the film is a monolayer film.

22. A multilayer film wherein at least one of the layers of the multilayer film comprises the film according to claim 15.

23. An article of manufacture comprising the film according to claim 15.

* * * * *